(12) United States Patent  
Misaki

(10) Patent No.: US 7,284,462 B2
(45) Date of Patent: Oct. 23, 2007

(54) FLEXIBLE DIE AND METHOD FOR ITS MANUFACTURE

(75) Inventor: Kaoru Misaki, Osaka (JP)

(73) Assignee: Tsukatani Hamono Mfg. Co., Ltd., Osaka (JP)

( * ) Notice: Subject to any disclaimer, the term of this patent is extended or adjusted under 35 U.S.C. 154(b) by 0 days.

(21) Appl. No.: 11/239,162

(22) Filed: Sep. 30, 2005

(65) Prior Publication Data

US 2006/0027044 A1 Feb. 9, 2006

Related U.S. Application Data

(62) Division of application No. 10/451,527, filed on Jun. 24, 2003, now abandoned.

(30) Foreign Application Priority Data

Dec. 28, 2000 (JP) ............................. 2000-400012

(51) Int. Cl.
*B21K 5/20* (2006.01)
(52) U.S. Cl. ..................... 76/107.8; 76/107.1; 216/100
(58) Field of Classification Search ............... 76/107.1, 76/107.8; 216/100
See application file for complete search history.

(56) References Cited

U.S. PATENT DOCUMENTS

| 3,077,807 | A | | 2/1963 | Wright |
| 3,383,991 | A | | 5/1968 | Sarka |
| 3,550,479 | A | | 12/1970 | Plaff, Jr. |
| 3,618,438 | A | | 11/1971 | Simon |
| 3,645,155 | A | | 2/1972 | Robinson |
| 3,850,059 | A | * | 11/1974 | Kang ..................... 83/880 |
| 3,952,179 | A | * | 4/1976 | Baker ................... 219/69.17 |
| 4,053,348 | A | | 10/1977 | Weglin |
| 4,579,022 | A | | 4/1986 | Kasai et al. |
| 4,966,054 | A | | 10/1990 | Beck |
| 4,981,061 | A | | 1/1991 | Hillock et al. |
| 5,544,549 | A | | 8/1996 | Helferich |
| 5,575,185 | A | | 11/1996 | Cox et al. |
| 5,687,622 | A | * | 11/1997 | Gerhardt ................. 76/107.1 |
| 5,733,465 | A | | 3/1998 | Kitamura et al. |
| 5,761,982 | A | * | 6/1998 | Abt et al. ................. 83/861 |
| 5,890,402 | A | * | 4/1999 | Nedbal ................... 76/107.1 |

(Continued)

FOREIGN PATENT DOCUMENTS

JP 4-19799 2/1992

(Continued)

OTHER PUBLICATIONS

International Search Report for PCT/JP01/11011 mailed on Mar. 19, 2002.

(Continued)

*Primary Examiner*—Hwei-Siu C. Payer
(74) *Attorney, Agent, or Firm*—Rader, Fishman & Grauer PLLC

(57) ABSTRACT

To obtain a push-cutting blade 2, a flexible base 1 and a projection (trapezoid-section projection 21) protruding from this base are formed by etching. Then, a lateral surface or surfaces of the projection 21 is cut into a vertical projection 2b. Lastly, the tip of the vertical projection 2b is sharpened to give a double (or single) cutting edge 2a.

6 Claims, 12 Drawing Sheets

U.S. PATENT DOCUMENTS

| | | |
|---|---|---|
| 5,916,335 A | 6/1999 | Gerhardt |
| 6,178,852 B1 | 1/2001 | Pfaff |
| 6,223,641 B1 | 5/2001 | Kang |
| 6,311,601 B1 | 11/2001 | Love |
| 2004/0020328 A1* | 2/2004 | Wang .................. 76/107.1 |

FOREIGN PATENT DOCUMENTS

| | | |
|---|---|---|
| JP | 07-032299 A1 | 2/1995 |
| JP | 7-136930 | 5/1995 |
| JP | 09-277198 A1 | 10/1997 |
| JP | 10-175200 A1 | 6/1998 |
| JP | 3054861 U | 9/1998 |
| JP | 2000-263498 A1 | 9/2000 |

OTHER PUBLICATIONS

Japanese Office Action dated Jun. 27, 2006 for Application No. 2002-554268.

* cited by examiner (A)

(B)

FLEXIBLE DIE AND METHOD FOR ITS MANUFACTURE

CROSS REFERENCE TO RELATED APPLICATIONS

The present application is a Divisional Application of the patent application Ser. No. 10/451,527, filed Jun. 24, 2003, now abandoned, which is based on Priority Document JP-2000-400012 filed on Dec. 28, 2000.

TECHNICAL FIELD

The present invention relates to a flexible die (sheet-like blade plate) which is used to cut (push-cut) a piece of thin paper, plastic sheet or the like along a given profile line, and a method for its manufacture.

BACKGROUND ART

In the field of printing machines, a flexographic printing machine has been put to practical use. This type of printing machine is composed of a magnet roll whose surface is laminated with a magnet chip. To perform printing, a flexible printing plate containing a ferromagnetic material (e.g. iron, ferrite, cobalt, nickel) is attached (sucked) on the magnetic roll. An advantage of the flexographic printing machine resides in its capacity to change the print image in a simple manner, merely by replacing flexible printing plates.

With regard to printed matters, a face-cut label product as exemplified in FIG. 16 is widely available among the public. In this face-cut label product, a laminated sheet 110 is composed of a backing sheet 101 made of paper, transparent plastic sheet, etc., and a printing sheet 102 laminated thereon via an adhesive. Images are printed on the top surface of the laminated sheet 110. After the printing, the laminated sheet 110 is cut along profile lines 103 surrounding the printed images, in such a manner that the cutting reaches no further than the printing sheet 102 on the top. In use, a label portion defined by the profile line 103 on the printing sheet 102 is peeled off from the backing sheet 101, and the label can be affixed onto a notebook, day planner, photo album, slip, file index, etc.

Such face-cut label product is made by a combination of printing and cutting technologies. In one of the applicable methods, a rotary die cutter 160 is employed to perform the cutting operation in the printing machine. As illustrated in FIG. 18, a flexible die (rotary die) 161 is prepared by arranging push-cutting blades 162 in a predetermined pattern on one surface of a flexible base (ferromagnetic material) 164. The flexible die 161 is attached (sucked) on a die cylinder 166.

For the die cutter, a flat die cutter 170 shown in FIG. 19 can be used as well. The flat die cutter 170 is constituted with a top platen 172 for up-down movement and a bottom platen 174 fixed opposite to the top platen 172. The top platen 172 securely mounts a flexible die (flat die) 171. The flexible die 171 is composed of a flexible base 176 fixed on the top platen 172 and push-cutting blades 178 projecting in a predetermined pattern from one surface of the flexible base 176. On the other hand, the top surface of the bottom platen 174 holds a workpiece 179 in opposition to the flexible die 171. With the up-down movement of the top platen 172, the flat die cutter 170 cuts the workpiece 179 into a desired shape.

Flexible dies of these types include a punching die equipped with a continuous push-cutting blade, and a so-called perforating blade in which cutting portions and non-cutting portions are formed alternately along the cutting line. These flexible dies can be made by machining, etching, etc. A flexible die made by etching is generally called etched blade.

Now, the description is directed to an example of the method for manufacturing a flexible die (etched blade).

To begin with, a photoresist is uniformly laminated onto the surface of a steel or other metal plate. When this photoresist layer is exposed and developed, the metal plate surface retains a photoresist pattern exclusively for the push-cutting blade. Using the remaining resist pattern as a mask, the metal plate is etched away to a predetermined depth to its back surface. This etching step provides a flexible base and a trapezoid-section projection (rib) which protrudes from the flexible base. The resist pattern is removed at this stage.

Turning to FIG. 17, the trapezoid-section projection 221 has its tip sharpened by a conical tool 4. Thus obtained is a flexible die (punching die) in which the flexible base 201 is formed with a triangular-section push-cutting blade 202.

As mentioned above, the flexible die shown in FIG. 17 has the push-cutting blade 202 with a triangular cross section. However, this configuration is detrimental to precision machining. Namely, when a thick material is punched, the dimensions of the blank differ significantly between the top (front) and the bottom (back) around the machined area. In addition, the triangular configuration may deteriorate the blade durability, because such push-cutting blade is subjected to a heavy pressure during the punching operation.

The present invention is made in view of these circumstances, and intends to provide a flexible die which enables precision machining of even a thick material and which imparts excellent durability to the push-cutting blade. The present invention also intends to provide a method for manufacturing this flexible die.

DISCLOSURE OF THE INVENTION

A flexible die of the present invention, which comprises a flexible base and a push-cutting blade formed in a predetermined pattern on one surface of the flexible base, is characterized in that the push-cutting blade is composed of a vertical projection protruding vertically from the flexible base, and a single cutting edge or a double cutting edge formed by sharpening a tip of the vertical projection.

A manufacturing method of the present invention relates to the manufacture of a flexible die which comprises a flexible base and a push-cutting blade formed in a predetermined pattern on one surface of the flexible base. This method is characterized in comprising the steps of: laminating a photoresist uniformly on a surface of a metal plate, and exposing and developing the photoresist layer, thereby to form a resist pattern for the push-cutting blade on the surface of the metal plate; with the use of the resist pattern as a mask, etching the metal plate to a predetermined depth, thereby to form the flexible base and a projection which protrudes from the base; cutting a lateral surface of the projection to shape a vertical projection; and sharpening a tip of the vertical projection to give a single cutting edge or a double cutting edge.

Another manufacturing method of the present invention relates to the manufacture of a flexible die which comprises a flexible base and a push-cutting blade formed in a predetermined pattern on one surface of the flexible base. This method is characterized in comprising the steps of: laminating a photoresist uniformly on a surface of a metal plate, and exposing and developing the photoresist layer, thereby to form a resist pattern for the push-cutting blade on the surface of the metal plate; with the use of the resist pattern as a mask, etching the metal plate to a predetermined depth, thereby to form the flexible base and a projection which protrudes from the base; sharpening a tip of the projection to give a single cutting edge or a double cutting edge; and cutting a lateral surface of the sharpened projection to shape a vertical projection.

Yet another manufacturing method of the present invention relates to the manufacture of a flexible die which comprises a flexible base and a push-cutting blade formed in a predetermined pattern on one surface of the flexible base. This method is characterized in comprising the steps of: laminating a photoresist uniformly on a surface of a metal plate, and exposing and developing the photoresist layer, thereby to form a resist pattern for the push-cutting blade on the surface of the metal plate; with the use of the resist pattern as a mask, etching the metal plate to a predetermined depth, thereby to form the flexible base and a projection which protrudes from the base; machining a lateral surface of the projection by wire EDM to shape a vertical projection; and sharpening a tip of the vertical projection to give a single cutting edge or a double cutting edge.

Still another manufacturing method of the present invention relates to the manufacture of a flexible die which comprises a flexible base and a push-cutting blade formed in a predetermined pattern on one surface of the flexible base. This method is characterized in comprising the steps of: laminating a photoresist uniformly on a surface of a metal plate, and exposing and developing the photoresist layer, thereby to form a resist pattern for the push-cutting blade on the surface of the metal plate; with the use of the resist pattern as a mask, etching the metal plate to a pre-determined depth, thereby to form the flexible base and a projection which protrudes from the base; sharpening a tip of the projection to give a single cutting edge or a double cutting edge; and machining a lateral surface of the sharpened projection by wire EDM to shape a vertical projection.

According to the present invention, the push-cutting blade is provided through a series of steps. The first step is to form, by etching, a flexible base and a projection (trapezoid-section projection) which protrudes from the base. The etching step is followed either by the steps of cutting a lateral surface of the projection to shape a vertical projection and sharpening the tip of the vertical projection to give a single or double cutting edge, or by the steps of sharpening the tip of the projection (trapezoid-section projection) to give a single or double cutting edge and cutting a lateral surface of the sharpened projection to shape a vertical projection. In either way, the resulting push-cutting blade has a smaller base width than the one provided in a conventional flexible die (see FIG. 17). Accordingly, the present invention can enhance machining precision in punching a material (even a thick material). Namely, with respect to the machined area, the top (front) dimension and the bottom (back) dimension of the material differs not so significantly as in the conventional example. Moreover, the push-cutting blade is sharpened not entirely, but only at the tip of the vertical projection. This push-cutting blade can press a material with a smaller contact area, which means the push-cutting blade receives less pressure during the punching operation. Eventually, the push-cutting blade can enjoy enhanced durability.

In the case where a lateral surface of the projection is machined by wire EDM to shape the vertical projection, a cavity is formed inside the flat die. This structure may prevent interference between the flexible base and the blank and improve the punching precision. The structure may also prevent the blank from jamming.

With respect to the manufacturing method, the wire EDM process, as compared with the mill machining process, imposes a less mechanical force on the workpiece, and hence does not cause deformation of the blade die. As a result, formation of a single cutting edge can be carried out closer to the tip of the blade. In addition, an angular-shape inner profiling can be accomplished as precisely as the wire diameter, which is impossible by the mill machining process. Furthermore, one of the vertical lateral surfaces can be inwardly tapered with a relative freedom.

BEST MODE FOR CARRYING OUT THE INVENTION

Embodiments of the present invention are hereinafter described with reference to the drawings.

Figure 1:
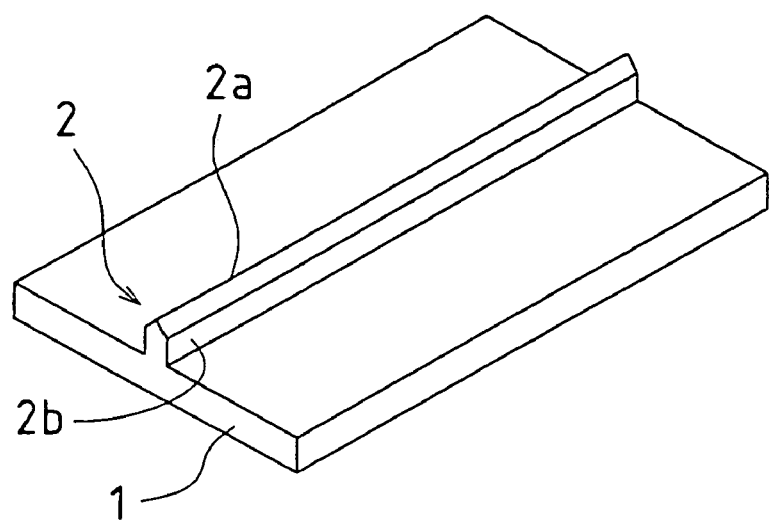
FIG. 1 is a perspective view showing the essential part of the flexible die according to an embodiment of the present invention.
Figure 2:
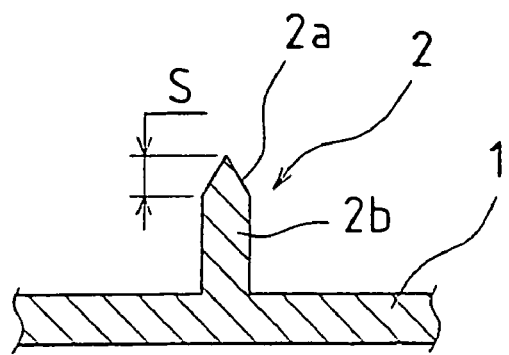
FIG. 2 is a vertical section of the flexible die illustrated in FIG. 1.

FIG. 1 shows, in perspective, the essential structure of a flexible die according to an embodiment of the present invention. FIG. 2 is a vertical section of this embodiment.

A flexible die of this embodiment is composed of a flexible base 1 and a push-cutting blade 2 formed on one surface thereof. Regarding the push-cutting blade 2, a vertical projection 2b protrudes vertically from the flexible base 1, with the tip being sharpened to give a double cutting edge 2a.

The flexible die shown in FIG. 1 is manufactured in the manner as described below and illustrated in FIG. 3, FIG. 4, FIG. 14 and FIG. 15.

Figure 14:
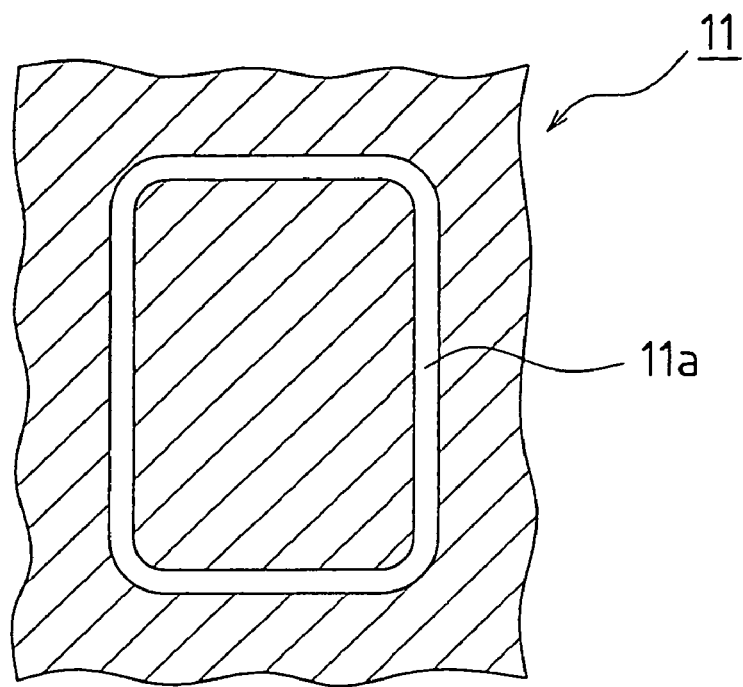
FIG. 14 is a schematic plan view of a photomask used in the manufacturing method shown in FIG. 3.
Figure 15:
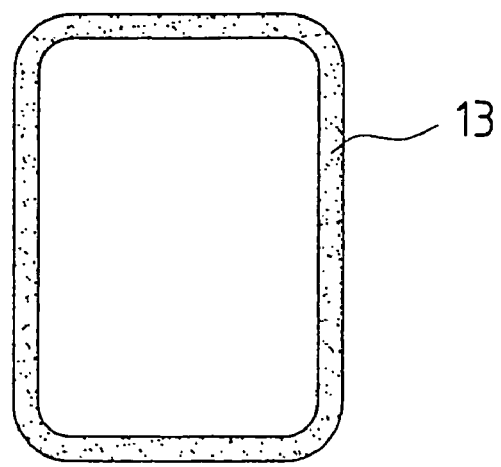
FIG. 15 is a schematic plan view of a resist pattern defined in the manufacturing method shown in FIG. 3.
Figure 16:
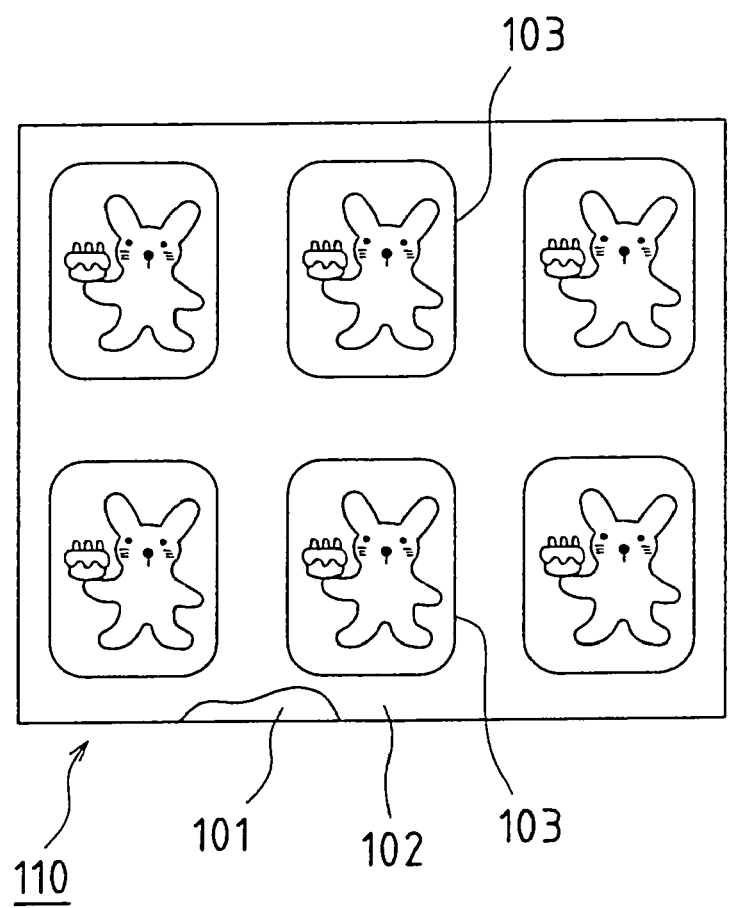
FIG. 16 is a front view of typical labels with a backing sheet.
Figure 17:
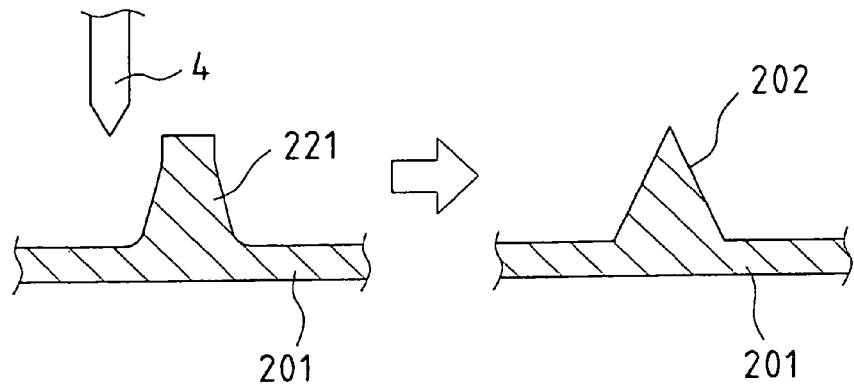
FIG. 17 is a vertical section of the essential part of a conventional flexible die.
Figure 18:
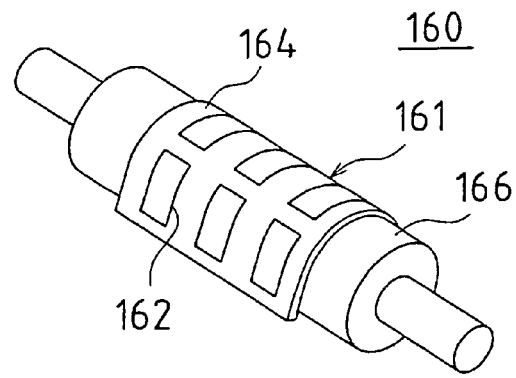
FIG. 18 is a schematic perspective view of a conventional rotary die cutter.
Figure 19:
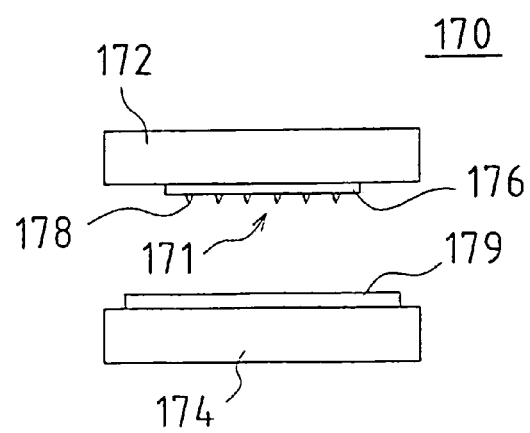
FIG. 19 is a schematic front view of a conventional flat die cutter.

(1) Prepare a photomask (film) 11, according to an exposure pattern 11a shown in FIG. 14 (The pattern corresponds to the profile line 103 in FIG. 16.).

(2) Apply a photoresist uniformly on the surface of a metal plate 10 which is a 0.50-mm-thick ferromagnetic steel plate (FIG. 3(A)). Expose the photoresist layer 12, with the photomask 11 aligned and positioned on the top of a photoresist layer 12 (FIG. 3(B)). Develop the exposed photoresist layer 12, thereby forming a resist pattern 13 (see FIG. 15) on the surface of the metal plate 10 (FIG. 3(C)).

(3) Using the resist pattern 13 as a mask, start the etching of the metal plate 10. Stop the etching when the metal plate 10 is etched away to a predetermined depth. This etching process forms the flexible base 1, together with a trapezoid-section projection (rib) 21 which extends along the cutting line (push-cutting blade formation line) on the flexible base 1 (FIG. 3(D)).

(4) Remove the resist pattern 13 (FIG. 3(E)). Then, using an NC (numerical control) machine, cut lateral surfaces of the trapezoid-section projection 21 by an end mill 3, thereby shaping a vertical projection 2b (FIG. 4(A)). Lastly, sharpen the tip of the vertical projection 2b by a conical tool 4, thereby giving a double cutting edge 2a (FIG. 4(B)). In the thus finished flexible die, the push-cutting blade 2 as shown in FIG. 1 and FIG. 2 is formed on one surface of the flexible base 1.

Figure 5:
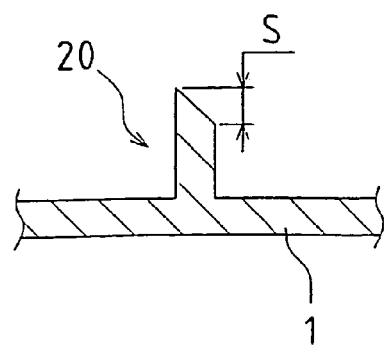
FIG. 5 is a vertical section of the essential part of the flexible die according to an alternative embodiment of the present invention.

Additionally, these manufacturing steps can provide a push-cutting blade 20 as depicted in FIG. 5. In this case, after the step shown in FIG. 4(A) is done, the tip of the vertical projection 2b is sharpened to give a single cutting edge.

Figure 6:
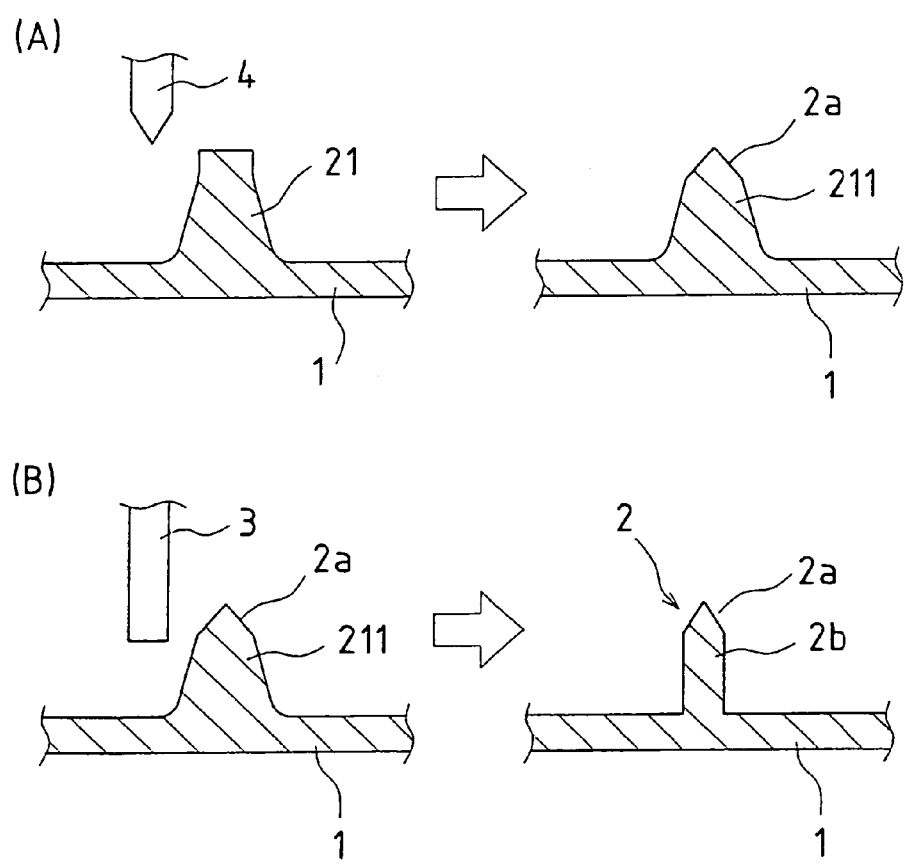
FIG. 6 illustratively describes another example of the method for manufacturing the flexible die illustrated in FIG. 1.
Figure 7:
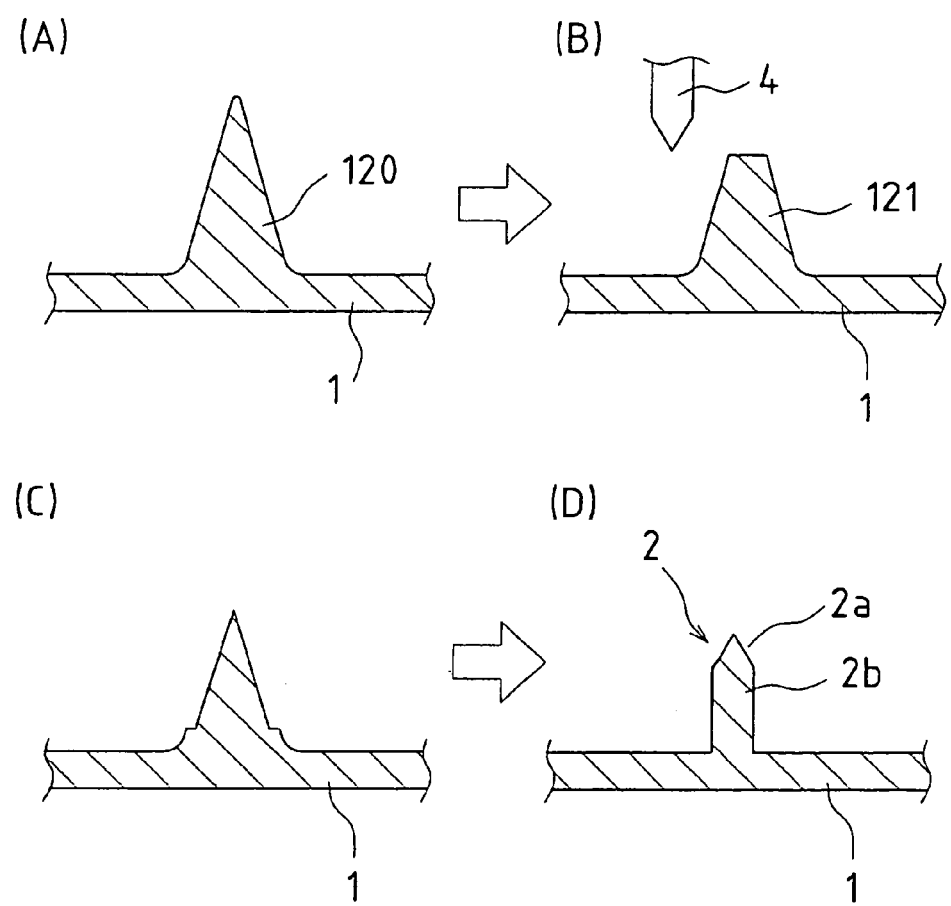
FIG. 7 illustratively describes an additional example of the method for manufacturing the flexible die illustrated in FIG. 1.

Incidentally, the above manufacturing steps are arranged to shape the etched trapezoid-section projection into the vertical projection, before sharpening the blade tip. However, the present invention can make the push-cutting blade 2 of FIG. 1 and FIG. 2 in other manners, without limitation. For example, referring to FIGS. 6(A) and (B), the tip of the trapezoid-section projection 21 may be sharpened to give the double cutting edge 2a by the conical tool 4, and, thereafter, lateral surfaces (inclined surfaces) of the sharpened projection 211 may be cut by the end mill 3.

Further regarding the above-manufacturing steps, the projection formed by etching has a trapezoidal cross section, the tip of which is sharpened later. Alternatively, the present invention can utilize, without limitation, projections of other sectional configurations. To give an example, as illustrated in FIGS. 7(A)-(D), a projection 120 of triangular section may be formed by etching and shaped into a trapezoid-section projection 121, the tip of which is sharpened afterwards.

Figure 9:
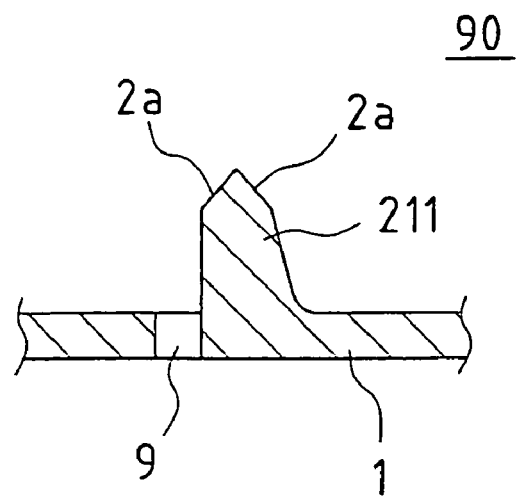
FIG. 9 is a vertical section of the flexible die according to another embodiment of the present invention.

The next description is directed to a flexible die according to another embodiment of the present invention. FIG. 9 is a vertical section of this flexible die.

A flexible die 90 of this embodiment is composed of a flexible base 1 and a push-cutting blade 2 formed on one surface thereof. Regarding the push-cutting blade 2, a vertical projection 211 protrudes vertically from the flexible base 1, with the tip being sharpened to give a double cutting edge 2a. A cavity 9 is formed on the vertical surface side (i.e. inside) of the vertical projection 211.

The flexible die 90 shown in FIG. 9 is manufactured in the following manner.

Figure 3:
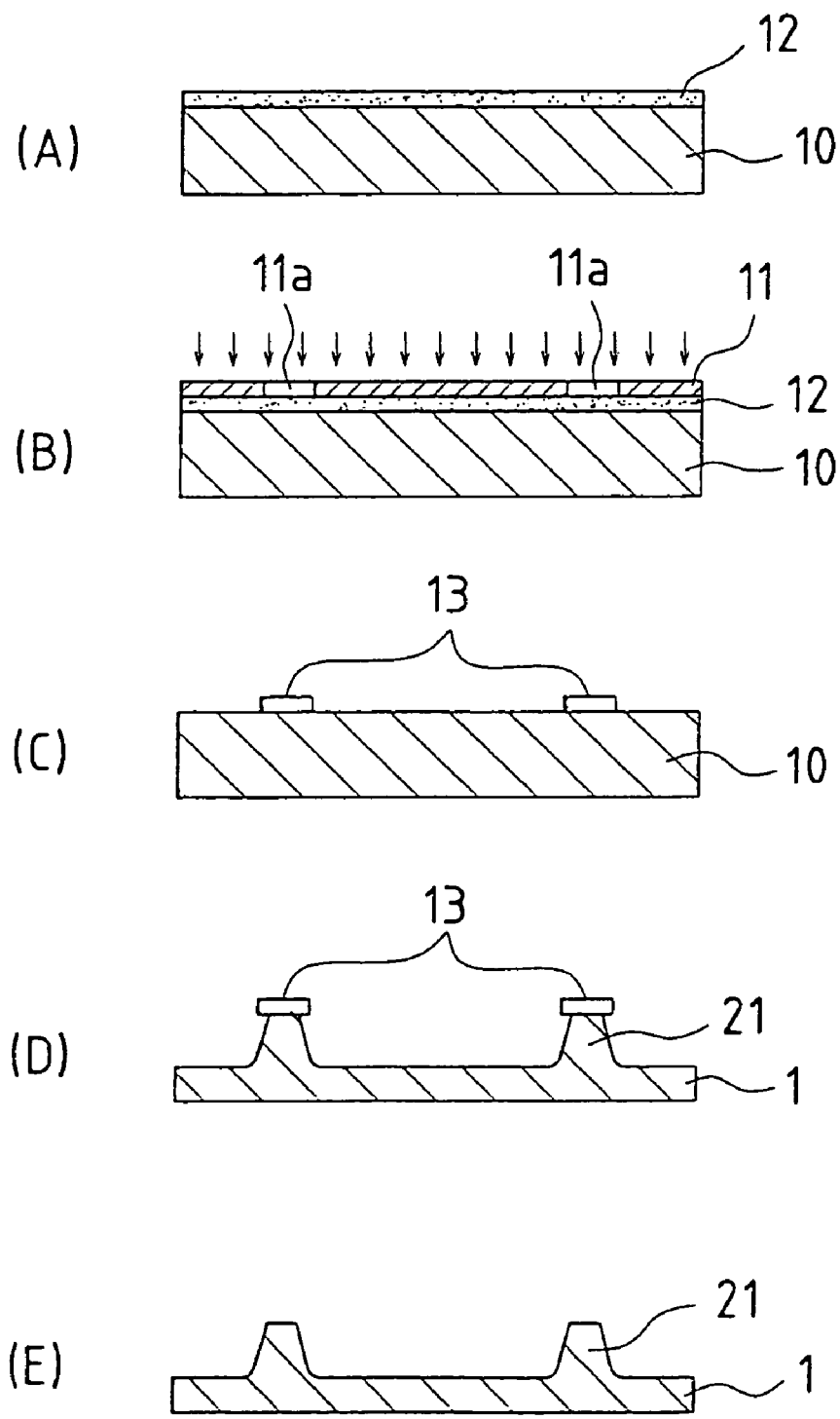
FIG. 3 and FIG. 4 illustratively describe an example of the method for manufacturing the flexible die illustrated in FIG. 1.
Figure 4:
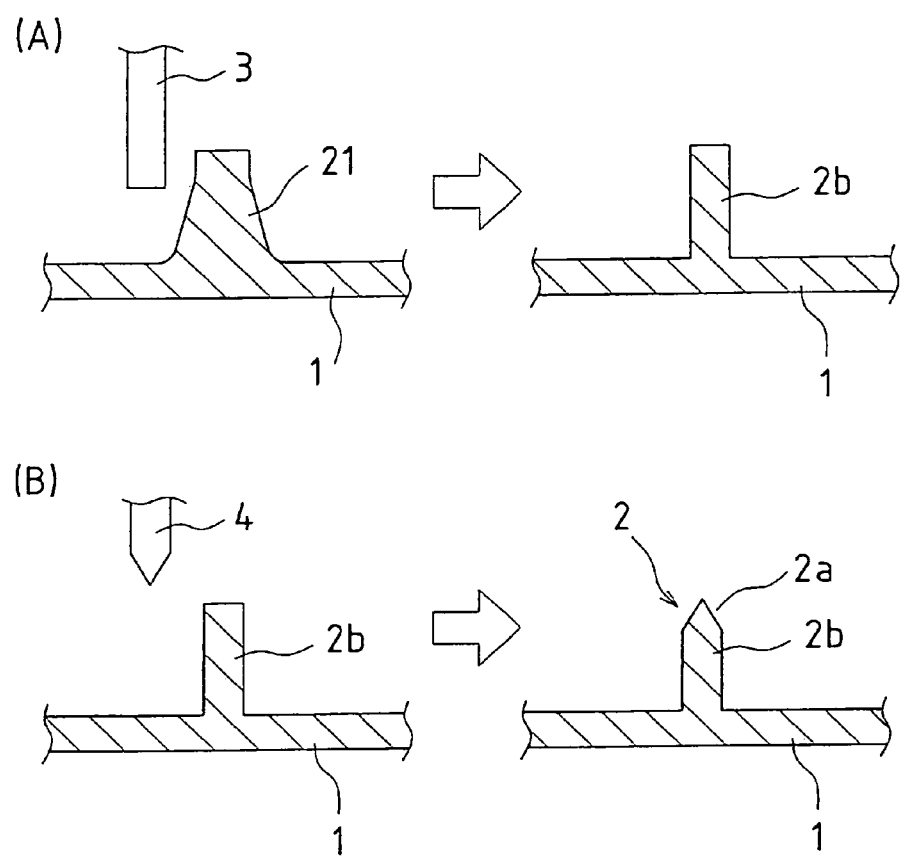

It should be understood that the manufacturing steps described in FIG. 3, which concern the method for manufacturing the flexible die of FIG. 1, are similarly applicable to the method mentioned below. The flexible die obtained in FIG. 3(E) is utilized in the manufacturing method illustrated in FIG. 10 or FIG. 11.

Figure 10:
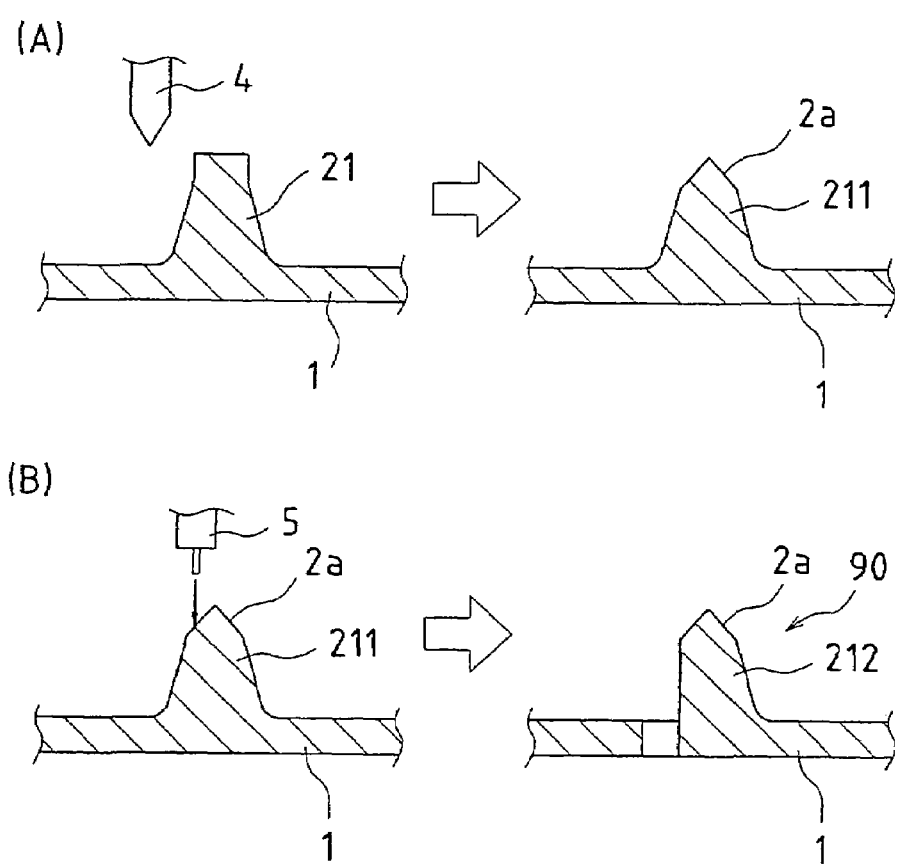
FIG. 10 illustratively describes an example of the method for manufacturing the flexible die illustrated in FIG. 9.

Firstly, the manufacturing method of FIG. 10 is described. As shown in FIG. 10(A), using a conical tool 4, the tip of the vertical projection 21 is sharpened into a double cutting edge 2a. In this sharpened projection 211, a small start hole for wire EDM (electric discharge machining) is drilled by means of an NC EDM drilling machine which operates according to NC data. Incidentally, this NC data is created in advance in DXF (data exchange file) format, based on original drawing data. After the small hole is pierced, the projection 211 is fixed with respect to a wire EDM machine 5. Then, the inner lateral surface of the projection 211 is machined vertically, according to the NC data. The flexible die (flat die) 90 having a vertical projection 212 is manufactured in this manner.

As for the wire EDM process, use of a CCD camera for position detection can realize high precision machining with a positional precision of ±20 µm. Compared with the mill machining process, the wire EDM process imposes a less mechanical force on the workpiece, and hence does not cause deformation of the blade die. As a result, formation of a single cutting edge can be carried out closer to the tip of the blade. In addition, an angular-shape inner profiling can be accomplished as precisely as the wire diameter, which is impossible by the mill machining process. In this embodiment, the machined surface can be finished up to 2 µm Rmax.

Figure 11:
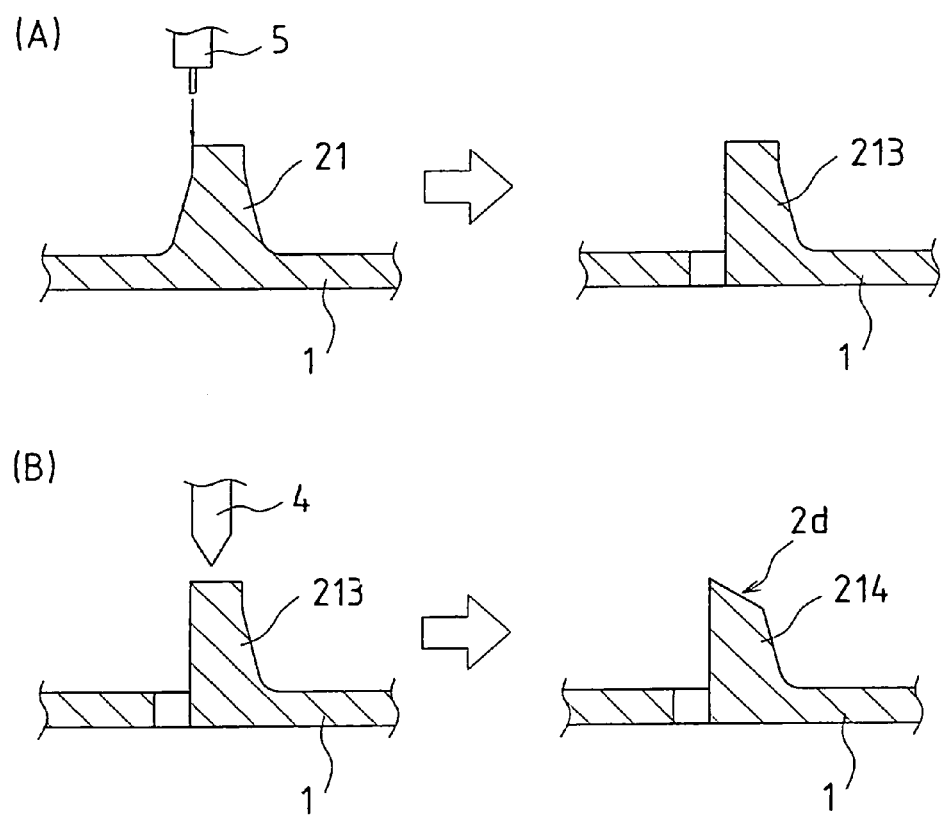
FIG. 11 illustratively describes another example of the method for manufacturing the flexible die illustrated in FIG. 9.

Incidentally, the above manufacturing steps are arranged to shape the vertical projection by wire EDM, after the tip of the blade is sharpened. Instead, as illustrated in FIG. 11, the vertical projection may be formed before the sharpening of the blade tip. According to the manufacturing method of FIG. 11, a vertical projection 213 is shaped first by a wire EDM machine 5 (FIG. 11(A)), just as in the method shown in FIG. 10. Thereafter, the vertical projection 213 has its tip sharpened into a single cutting edge 2d, so as to be the vertical projection 214 (FIG. 11(B)).

Figure 12:
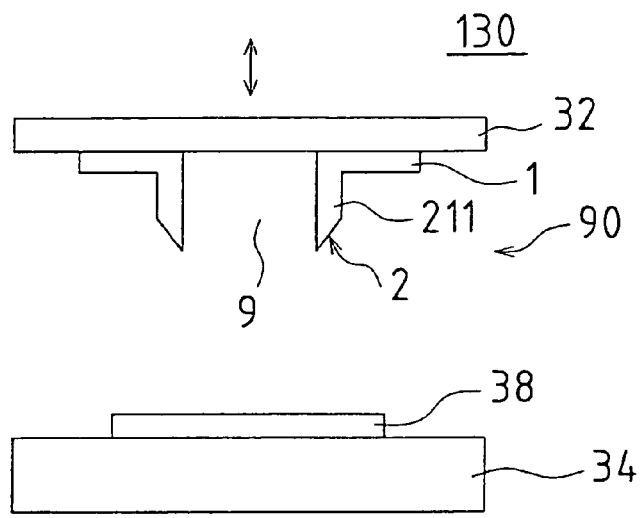
FIG. 12 is a schematic front view showing the flexible die of FIG. 9, as applied in a flat die cutter.

The flexible die 90 of FIG. 9, manufactured by the above method, is applicable to a flat die cutter 130. FIG. 12 is a schematic front view showing such application.

The flat die cutter 130 is constituted with a top platen 32 for up-down movement and a bottom platen 34 fixed opposite to the top platen 32. One surface of the top platen 32 securely mounts the flexible die (flat die) 90 from which the push-cutting blade 2 projects in a predetermined pattern. On the other hand, the top surface of the bottom platen 34 holds a workpiece 38 in opposition to the flexible die 90.

Figure 13:
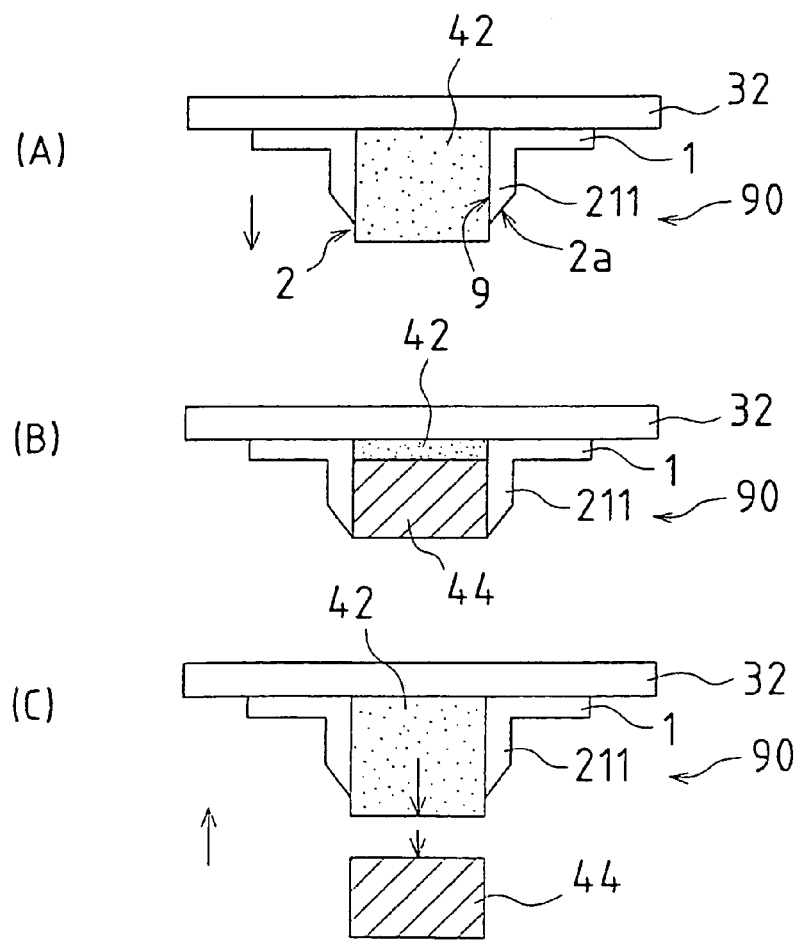
FIG. 13 illustratively describes the operation of the flexible die of FIG. 9, as applied in a flat die cutter.

The operation of the flat die cutter equipped with the flexible die 90 is stated below, with reference to the descriptive illustrations in FIG. 13.

Regarding the structure of this flat die cutter (The bottom platen is not shown.), a cavity 9 is defined inside the flexible die 90 and fitted with a sponge 42 in such a manner that the sponge 42 protrudes from the cutting edge 2a (FIG. 13(A)). When this top platen 32 descends and cuts the workpiece 38 (at which moment the top platen 32 is stationary), a blank 44 fits inside the flexible die 90, pushing up the sponge 42 (FIG. 13(B)). Later, in response to the ascent of the top platen 32, the blank 44 is released from the flexible die 90, due to the elasticity of the sponge 42 (FIG. 13(C)).

Incidentally, with respect to the formation of the push-cutting blade 2 (double-edged) shown in FIG. 1 and FIG. 2, the above manufacturing steps can provide, for example, a push-cutting blade with an included angle of 60 degrees and a cutting edge width S of 0.3 mm or 0.4 mm, or a push-cutting blade with an included angle of 50 degrees and a cutting edge width S of 0.3 mm or 0.4 mm. Regarding the push-cutting blade 20 (single-edged) shown in FIG. 5, these manufacturing steps can provide a push-cutting blade with an included angle of 45 degrees and a cutting edge width S of 0.4 mm, or a push-cutting blade with an included angle of 40 degrees and a cutting edge width S of 0.4 mm.

Figure 8:
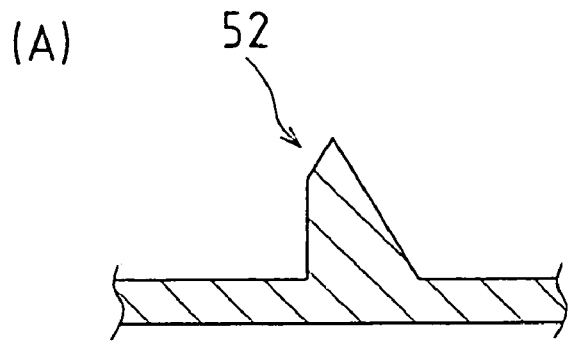
FIG. 8 shows modified examples of the push-cutting blade formed on the flexible die.
Figure 8:
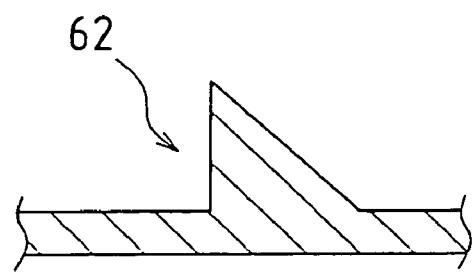

As for the push-cutting blade formed on the flexible die, the configuration is not limited to the ones depicted in FIG. 2 and FIG. 5, and encompasses the configurations embodied in push-cutting blades 52, 62 (FIGS. 8(A) and (B)).

In the above-mentioned manufacturing method, there is no particular limitation of photoresists, etchants and resist removers. Those generally used for the manufacture of etched blades can be employed at operator's option.

Moreover, in the foregoing description, each example of this manufacturing method is focused on a push-cutting blade with a rectangular cutting line (with four round corners). In addition, present invention is applicable, without limitation, to various flexible dies for cutting triangular or circular shapes; animals, cartoon characters and other images; floral patterns; letters and other complex configurations.

Further, the present invention is applicable not only to a flexible die (punching die) equipped with a continuous push-cutting blade, but also to a perforating blade in which cutting portions and non-cutting portions are formed alternately along the cutting line.

Furthermore, application of the present invention is not limited to face-cutting, but includes punching-out of labels and the like.

INDUSTRIAL APPLICABILITY

As has been described, the flexible die of the present invention is equipped with a push-cutting blade which has a smaller base width than the one provided in a conventional flexible die. Accordingly, the present invention can enhance machining precision in punching a material (even a thick material). Namely, with respect to the machined area, it is possible to reduce the difference between the top (front) dimension and the bottom (back) dimension of the material. Besides, since the blade is sharpened only at the tip of the vertical projection, the push-cutting blade receives less pressure during the punching operation. As a consequence, the flexible die of the present invention can improve the durability of the push-cutting blade and extend its service period, thereby enhancing the productivity. At the same time, it is possible to reduce the production cost, showing an economic advantage as well.

The invention claimed is:

1. A method for manufacturing a flexible die which comprises a flexible base and a push-cutting blade formed in a predetermined pattern on one surface of the flexible base, characterized in comprising the steps of:
    laminating a photoresist layer uniformly on a surface of a metal plate, and exposing and developing the photoresist layer, thereby to form a resist pattern for the push-cutting blade on the surface of the metal plate;
    with the use of the resist pattern as a mask, etching the metal plate to a predetermined depth, thereby to form the flexible base and a projection which protrudes from the base;
    cutting a lateral surface of the projection to shape the projection into at least one side wall extending perpendicularly with respect to the flexible base; and
    sharpening a tip of the projection to give a single cutting edge or a double cutting edge.

2. A method for manufacturing a flexible die according to claim 1, wherein the step of cutting comprises using wire EDM to cut the lateral surface of the projection to shape the projection which is integrated with the flexible base.

3. A method for manufacturing a flexible die according to claim 1, wherein the step of cutting comprises using wire EDM to cut the lateral surface of the projection to shape the projection which is integrated with the flexible base, and to cut the flexible base to form a cavity therethrough on said at least one side wall of the projection.

4. A method for manufacturing a flexible die which comprises a flexible base and a push-cutting blade formed in a predetermined pattern on one surface of the flexible base, characterized in comprising the steps of:
    laminating a photoresist layer uniformly on a surface of a metal plate, and exposing and developing the photoresist layer, thereby to form a resist pattern for the push-cutting blade on the surface of the metal plate;
    with the use of the resist pattern as a mask, etching the metal plate to a predetermined depth, thereby to form the flexible base and a projection which protrudes from the base;
    sharpening a tip of the projection to give a single cutting edge or a double cutting edge; and
    cutting a lateral surface of the sharpened projection to shape the sharpened projection into at least one side wall extending perpendicularly with respect to the flexible base.

5. A method for manufacturing a flexible die according to claim 4, wherein the step of cutting comprises using wire EDM to cut the lateral surface of the sharpened projection to shape the sharpened projection which is integrated with the flexible base.

6. A method for manufacturing a flexible die according to claim 4, wherein the step of cutting comprises using a wire EDM to cut the lateral surface of the sharpened projection to shape the sharpened projection which is integrated with the flexible base, and to cut the flexible base to form a cavity therethrough on said at least one side wall of the projection.

* * * * *